(12) United States Patent
Taguchi et al.

(10) Patent No.: US 8,109,365 B2
(45) Date of Patent: Feb. 7, 2012

(54) ENGINE SUPERCHARGER LUBRICATING APPARATUS

(75) Inventors: Arata Taguchi, Yokohama (JP); Hidetsugu Komatsu, Ayase (JP)

(73) Assignee: Nissan Motor Co., Ltd., Yokohama (JP)

( * ) Notice: Subject to any disclaimer, the term of this patent is extended or adjusted under 35 U.S.C. 154(b) by 934 days.

(21) Appl. No.: 12/061,039

(22) Filed: Apr. 2, 2008

(65) Prior Publication Data
US 2008/0277201 A1 Nov. 13, 2008

(30) Foreign Application Priority Data

May 9, 2007 (JP) ................................. 2007-124316

(51) Int. Cl.
*F01M 1/04* (2006.01)
(52) U.S. Cl. ........................................................ 184/6.11
(58) Field of Classification Search .................... 184/6.5
See application file for complete search history.

(56) References Cited

U.S. PATENT DOCUMENTS

| | | | | |
|---|---|---|---|---|
| 3,927,530 A | * | 12/1975 | Braun | 60/607 |
| 4,142,608 A | * | 3/1979 | Sarle | 184/6.11 |
| 4,422,295 A | * | 12/1983 | Minami et al. | 60/605.3 |
| 4,752,193 A | * | 6/1988 | Hörler | 417/407 |
| 6,394,078 B1 | | 5/2002 | Kling | |
| 7,249,598 B1 | * | 7/2007 | Richardson | 123/572 |
| 7,360,361 B2 | * | 4/2008 | Prusinski et al. | 60/608 |

FOREIGN PATENT DOCUMENTS

| | | |
|---|---|---|
| EP | 1 065 350 A2 | 1/2001 |
| GB | 2 416 812 A | 2/2006 |
| JP | S58-135325 | 8/1983 |
| JP | H08-158876 A | 6/1996 |

* cited by examiner

*Primary Examiner* — William A Rivera
*Assistant Examiner* — Mark K Buse
(74) *Attorney, Agent, or Firm* — Global IP Counselors, LLP

(57) ABSTRACT

An engine supercharger lubricating apparatus is provided with an oil passage, a pump and an air introducing passage. The oil passage is configured and arranged to supply a lubricating oil to a supercharger of an engine and to return the lubricating oil from the supercharger to an oil pan. The pump is arranged in the oil passage at a location downstream of the supercharger for pumping the lubricating oil from the supercharger to the oil pan. The air introducing passage is arranged to introduce air into the oil passage at a location downstream of the supercharger and upstream of the pump.

9 Claims, 3 Drawing Sheets

ENGINE SUPERCHARGER LUBRICATING APPARATUS

CROSS-REFERENCE TO RELATED APPLICATIONS

This application claims priority to Japanese Patent Application No. 2007-124316, filed on May 9, 2007. The entire disclosure of Japanese Patent Application No. 2007-124316 is hereby incorporated herein by reference.

BACKGROUND OF THE INVENTION

1. Field of the Invention

The present invention generally relates to an engine supercharger lubricating apparatus for lubricating a supercharger.

2. Background Information

Some internal combustion engines are provided with a supercharger, e.g., a turbocharger, having a rotary shaft. In the case of a turbocharger, for example, the rotary shaft connects a compressor and a turbine together. A lubricating apparatus is provided which has a suction device for drawing in lubricating oil to lubricate the rotary shaft and discharge the lubricating oil into an oil pan of the engine. One example of such a lubricating apparatus is disclosed in Japanese Laid-Open Patent Publication No. 8-158876.

The lubricating apparatus disclosed in this publication is provided with an oil passage for returning the lubricating oil to the oil pan after the lubricating oil has been supplied to the rotary shaft of the turbocharger.

In view of the above, it will be apparent to those skilled in the art from this disclosure that there exists a need for an improved engine supercharger lubricating apparatus. This invention addresses this need in the art as well as other needs, which will become apparent to those skilled in the art from this disclosure.

SUMMARY OF THE INVENTION

It has been discovered that with the lubricating apparatus presented in Japanese Laid-Open Patent Publication No. 8-158876, it is difficult to lubricate the supercharger in a satisfactory manner by controlling the operating state of a vacuum pump. Thus, when the amount of lubricating oil drawn by the vacuum pump is small, excess lubricating oil accumulates in the supercharger. Thus, there is a possibility that lubricating oil will leak into the compressor and the turbine. Conversely, when the amount of lubricating oil drawn by the vacuum pump is large, there is the possibility that the amount of lubricating oil inside the supercharge will become insufficient.

Accordingly, one object of the present invention is to provide a supercharger lubricating apparatus that can lubricate a supercharger in a satisfactory manner.

In order to achieve the above stated object and other objects of the present invention, an engine supercharger lubricating apparatus is provided that basically comprises an oil passage, a pump and an air introducing passage. The oil passage is configured and arranged to supply a lubricating oil to a supercharger of an engine and to return the lubricating oil from the supercharger to an oil pan. The pump is arranged in the oil passage at a location downstream of the supercharger for pumping the lubricating oil from the supercharger to the oil pan. The air introducing passage is arranged to introduce air into the oil passage at a location downstream of the supercharger and upstream of the pump.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
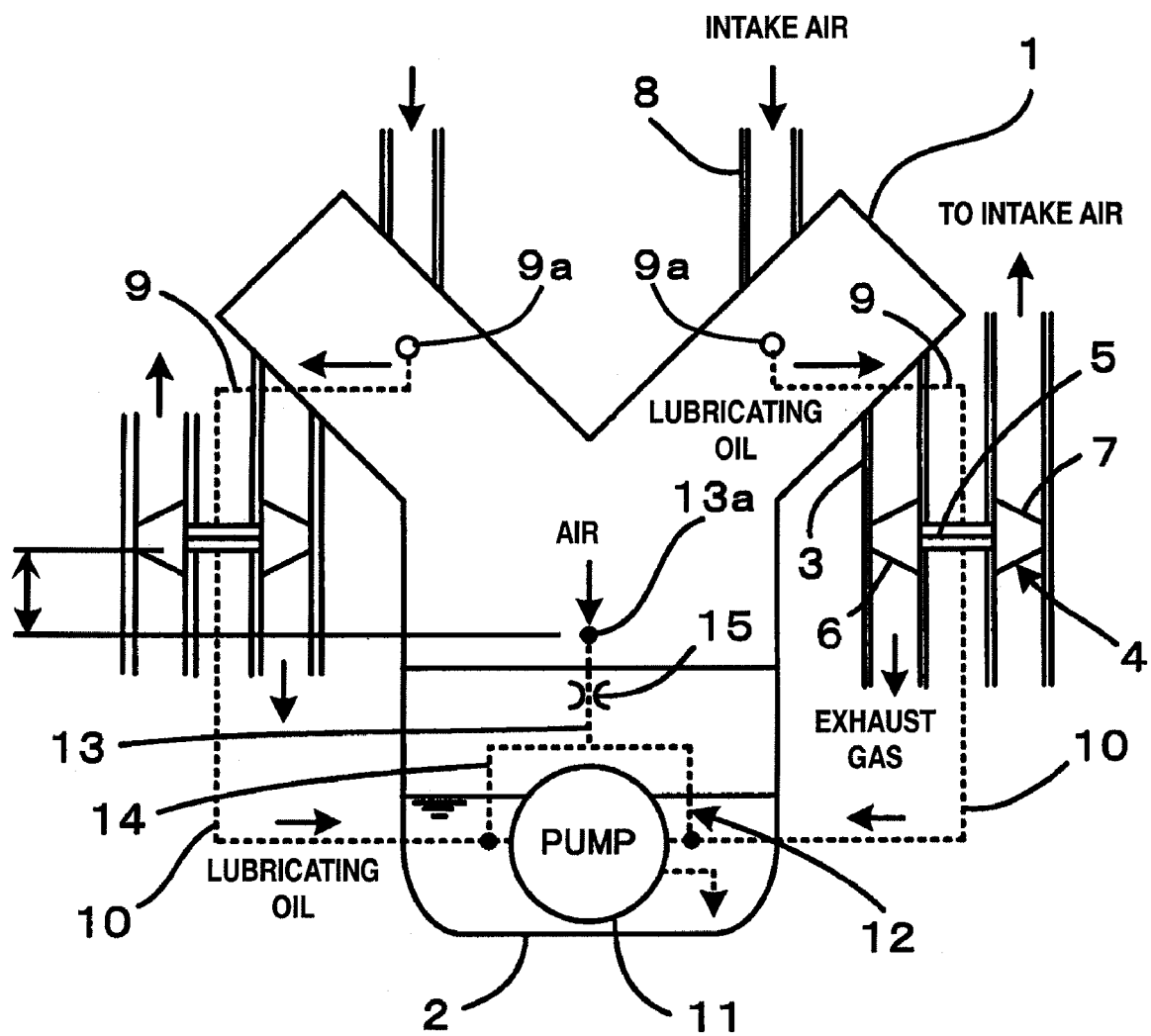
FIG. 1 is a schematic view of a V-type engine with a supercharger lubricating apparatus in accordance with a first embodiment.

Referring initially to FIG. 1, a V-type engine is schematically illustrated with an engine supercharger lubricating apparatus in accordance with a first embodiment. As shown in FIG. 1, the engine has a cylinder block 1 and an oil pan 2. The oil pan 2 serves to store a lubricating oil that is used to lubricate the engine. An exhaust pipe 3 is connected to each cylinder bank of the cylinder block 1. Exhaust gas discharged from each cylinder bank of the cylinder block 1 passes through the corresponding one of the exhaust pipes 3.

A turbocharger 4 serving as a supercharger is arranged at an intermediate position in each of the exhaust pipes 3. Each of the turbochargers 4 basically includes a rotary shaft 5, a turbine 6 and a compressor 7. The turbine 6 is rotated by the energy of the exhaust gas. The compressor 7 is integrally connected to the turbine 6 with the rotary shaft 5. The compressor 7 rotates together with the turbine 6 and serves to introduce air into an air induction pipe 8.

The main features serving to supply and discharge lubricating oil to and from the rotary shaft 5 of the turbocharger 4 will now be explained. Since the same features are used for both cylinder banks, the features of only one of the cylinder banks will be explained.

The rotary shaft 5 of the turbocharger 4 is rotatably arranged in a housing (not shown in the figures). A lubricating film made of lubricating oil forms between the rotary shaft 5 and the housing, enabling the turbocharger 4 to rotate smoothly. The lubricating oil is a lubricant having the same components as typical engine oil. The lubricating oil is supplied to the rotary shaft 5 by via a supply passage 9 connected to an oil passage that carries the lubricating oil through the inside of the cylinder block 1. The supply passage 9 is arranged upstream of the rotary shaft 5 and includes a supply pump 9a. The supply pump 9a is driven by a drive source not shown in the figures. The lubricating oil supplied to the rotary shaft 5 is prevented from leaking to the turbine or the compressor 7 by a seal (not shown) provided between the rotary shaft 5 and the housing. Excess lubricating oil supplied to the rotary shaft 5 is recovered by the oil pan 2 through a recovery pipe (oil passage) 10 provided downstream of the rotary shaft 5.

The separate recovery pipes 10 of the cylinder banks merge together such that the lubricating oil discharged from the rotary shafts 5 of the turbochargers 4 is recovered to the inside of the oil pan 2. A pump 11 is arranged in the portion where the recovery pipes 10 merge together. Thus, in this embodiment, the pump 11 has two inlets, one connected to the recovery pipe 10 of the left cylinder banks and the other connected to the recovery pipe 10 of the right cylinder bank. The pump 11 has one outlet arranged to discharge lubricating oil into the oil pan 2. The operation of the pump 11 lowers the pressure inside the recovery pipes 10 and causes the lubricating oil from the rotary shafts 5 to be recovered to the oil pan 2 in an efficient manner. The pump 11 is arranged inside the oil pan 2 on a side of the engine where a timing chain is located. A sprocket fixed to a rotary shaft of the pump 11 engages with timing chain and is driven by the rotation of the engine crankshaft.

An air introduction pipe (air introducing passage) 12 is connected to the recovery pipes 10 at positions upstream of the pump 11 for introducing air from the crankcase into the recovery pipes 10. The air introduction pipe 12 comprises an inlet pipe 13 arranged upstream and a pair of branch pipes 14 arranged downstream. The upstream end of the inlet pipe 13 has an opening part 13a arranged inside the crankcase for drawing in air. The downstream end of the inlet pipe 13 branches so as to form the branch pipes 14. Each of the branch pipes 14 connects to one of the recovery pipes 10 leading from the rotary shafts 5 of the turbochargers 4 and serves to introduce air into the respective one of the recovery pipes 10.

In this embodiment of the supercharger lubricating apparatus, the lubricating oil discharged from the rotary shafts 5 is recovered to the oil pan 2 using the pumping action of the pump 11. The negative pressure inside the recovery pipes 10 decreases when air is introduced thereto from the air introduction pipe 12, but the negative pressure state can be maintained by regulating the amount of air introduced to the recovery pipes 10. An orifice device 15 is installed in the inlet pipe 13. The orifice device 15 serves to regulate the flow rate (pressure) of the air supplied to the insides of the recovery pipes 10. The orifice device 15 can be a fixed orifice or a variable orifice. It is also acceptable to replace the orifice device 15 with a valve capable of variably adjusting the pressure of the air supplied to the recovery pipes 10. With the illustrated embodiment, the negative pressure inside the recovery pipes (oil passages) 10 can be adjusted by introducing air into the recovery pipes 10 via the air introducing passage 12, thus enabling the rotary shafts 4 to be lubricated satisfactorily.

Figure 2:
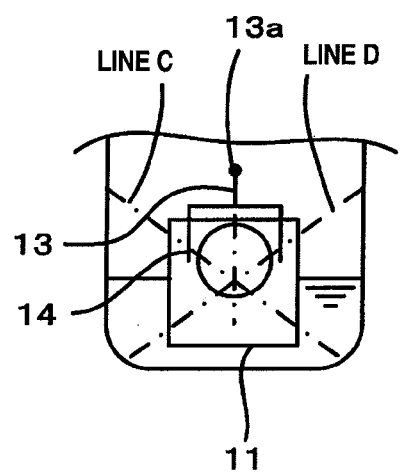
FIG. 2 is a diagrammatic transverse cross sectional view of the oil pan of the V-type engine illustrated in FIG. 1 for explaining the arrangement of an opening part of an air introduction pipe.
Figure 3:
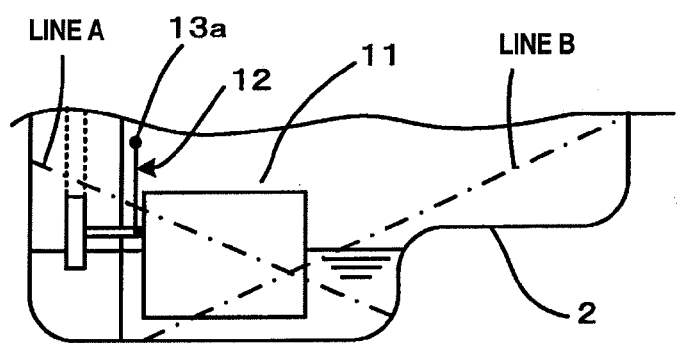
FIG. 3 is a diagrammatic longitudinal cross sectional view the oil pan of the V-type engine illustrated in FIG. 1 for explaining the arrangement of an opening part of an air introduction pipe.

The positioning of the opening part 13a of the inlet pipe 13 will now be explained using FIGS. 1, 2 and 3. FIG. 2 is a diagrammatic transverse cross sectional view of the oil pan of the V-type engine, while FIG. 3 is a diagrammatic longitudinal cross sectional view the oil pan of the V-type engine. As shown in FIG. 1, the opening part 13a and the turbochargers 4 are arranged such that the opening part 13a is positioned lower than the rotary shafts 5 of the turbochargers 4 when the vehicle is stationary on a level surface. Consequently, when the pump 11 is stopped, lubricating oil descending from the rotary shafts 5 of the turbochargers 4 can enter the air introduction pipe 12 from the recovery pipes 10 and exit into the oil pan 2 from the opening part 13a.

Meanwhile, the opening part 13a is positioned as shown in FIGS. 2 and 3 with respect to the surface of the lubricating oil inside the oil pan 2. FIGS. 2 and 3 also illustrate representative examples of how the oil surface changes when the vehicle moves. The oil surface is indicated with a single-dot chain line, when the lubricating oil is in a slanted state. For example, the line A of FIG. 3 indicates a maximally slanted state of the oil surface during braking, while the line B of FIG. 3 indicates a slanted state of the oil surface during acceleration. Lines C and D of FIG. 2 indicate the oil surface during a left turn and a right turn, respectively. The opening part 13a is arranged such that it protrudes into the oil pan 2 at a position that is always higher than the oil surface regardless of the state of motion of the vehicle. Consequently, air can be sent from the opening part 13a to the recovery pipes 10 and the negative pressure inside the recovery pipes 10 can be maintained at an appropriate pressure at all times regardless of the manner in which the vehicle is being driven.

The operational effects of the embodiment will now be explained.

The turbochargers 4 rotate at high speeds. Lubricating oil is supplied from the supply passages 9 to the rotary shafts 5 of the turbochargers 4 such that the turbochargers 4 are kept in a state in which it can rotate properly. Any excess amount of lubricating oil supplied to the rotary shafts 5 is discharged to the recovery pipes 10 due to the action of the pump 11 and is pumped (returned) to the oil pan 2 by the pump 11.

When the pump 11 is running, a negative pressure is generated inside the recovery pipes 10. The negative pressure causes the lubricating oil inside the rotary shafts 5 to be drawn into the pump 11 and discharged to the oil pan 2 in an efficient manner.

In the illustrated embodiment, the air introduction pipe 12 introduces air from the crankcase into the recovery pipes 10. The air introduction pipe 12 is connected to the recovery pipes 10 upstream of the pump 11 and serves to introduce air into the recovery pipes 10. The introduction of air causes the negative pressure inside the recovery pipes 10 to decrease (shift closer to the atmospheric pressure) in comparison to the negative pressure generated by the pump 11. However, the orifice device 15 (pressure control device) serves to regulate the pressure to a prescribed pressure that is sufficient to maintain a negative pressure in the recovery pipe 10. By regulating the negative pressure inside the recovery pipe 10 in this way, the amount of lubricating oil discharged from the rotary shaft 5 can be easily controlled so as to keep the rotary shaft 5 in a properly lubricated state.

The opening part 13a of the air introduction pipe 12 is arranged in such a position that it is higher than the surface of the oil in the oil pan 2 regardless of the movement state of the vehicle. Consequently, the opening part 13a never becomes immersed in the lubricating oil and air can be introduced into the recovery pipes 10 at all times. As a result, the negative pressure inside the recovery pipes 10 can be regulated, the excess lubricating oil can be discharged appropriately from the rotary shafts 5 to the oil pan 2, and the turbochargers 4 can be kept in a state in which it can rotate properly.

The opening part 13a of the air introduction pipe 12 is arranged such that it is positioned lower than the rotary shaft 5 of the turbocharger 4 when the vehicle is stopped on a level surface. As a result, lubricating oil that flows down the recovery pipes 10 due to gravity when the vehicle is stopped (and thus the pump 11 is stopped) can be discharged from the opening part 13a of the air introduction pipe 12 without being inhibited by the pump 11 installed in the recovery pipes 10.

Thus, lubricating oil can be prevented form leaking to the turbine 6 and the compressor 7.

Second Embodiment

Figure 4:
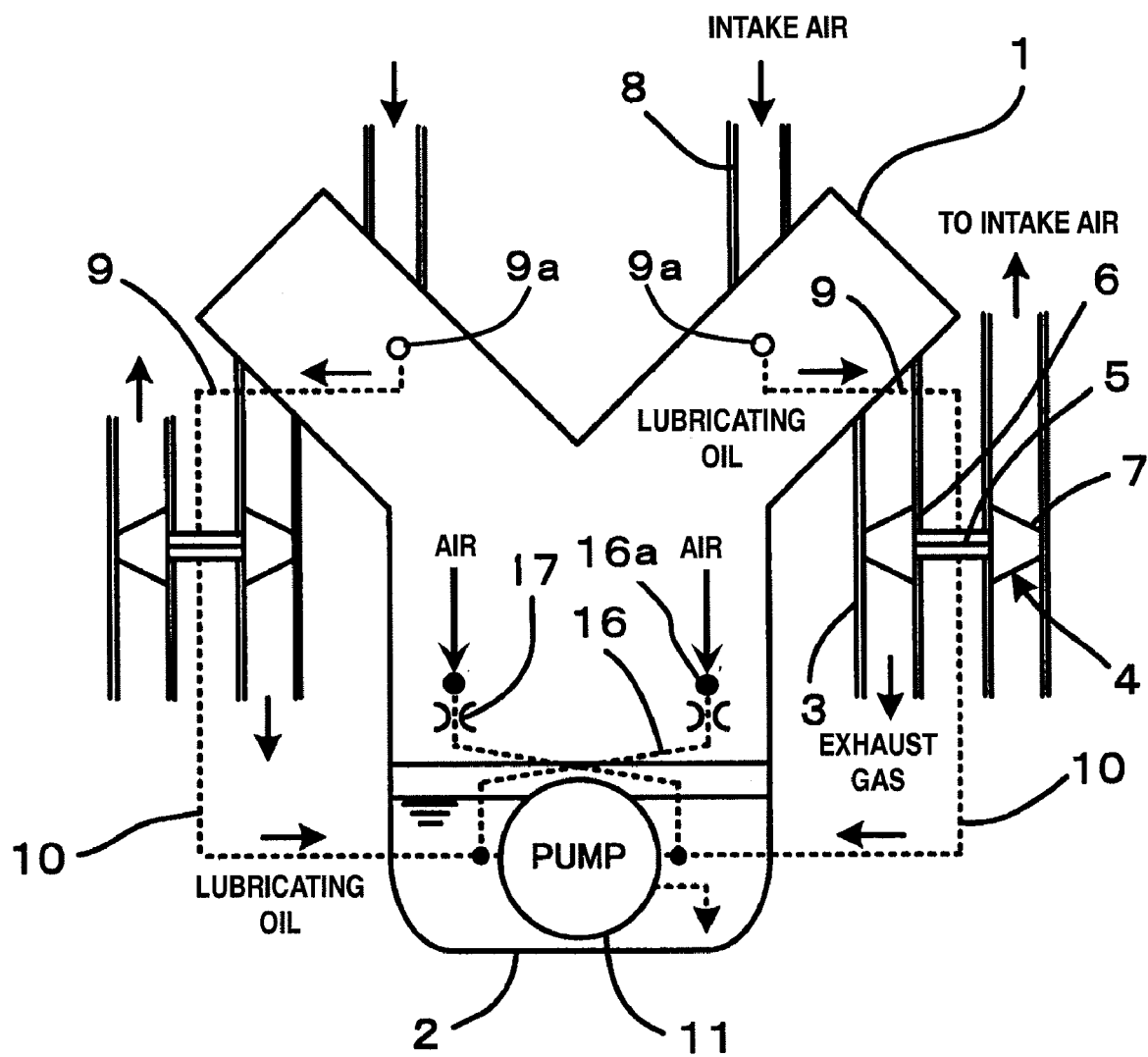
FIG. 4 is a schematic view of a V-type engine with a supercharger lubricating apparatus in accordance with a second embodiment.

Referring now to FIG. 4, an engine supercharger lubricating apparatus in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The structure of the air introduction pipe is different than in the first embodiment in that each of the recovery pipes 10 is provided with a separate air introduction pipe 16. Additionally, an orifice device 17 is provided in each of the air introduction pipes 16. The opening part 16a at the upstream end of each of the air introduction pipes 16 is arranged in such a position that it will not become immersed in lubricating oil regardless of the traveling state (movement state) of the vehicle. The second embodiment can provide the same effects as the first embodiment.

The present invention is supercharger lubricating apparatus, comprising: an oil passage 10 contrived to supply a portion of a lubricating oil from an inside of an engine to a turbocharger 4 and discharge the lubricating oil from the turbocharger 4 to an oil pan 2; a pump 11 arranged in the oil passage downstream of the turbocharger and contrived to pump the lubricating oil into the oil pan 2; and an air introduction pipe 12 arranged and configured to introduce air to the oil passage upstream of the pump 11. The negative pressure inside the recovery pipe 10 that guides the lubricating oil to the oil pan 2 is regulated with air pressure from the air introduction pipe 12 such that lubricating oil for lubricating the rotary shaft 5 of the turbocharger 4 can be recovered to the oil pan 2 in a stable manner.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the engine as described herein. Accordingly, these terms, as utilized to describe the present invention should be interpreted relative to the engine of a vehicle equipped.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An engine supercharger lubricating apparatus comprising:
    an oil passage configured and arranged to supply a lubricating oil to a supercharger of an engine and to return the lubricating oil from the supercharger to an oil pan;
    a pump arranged in the oil passage at a location downstream of the supercharger for pumping the lubricating oil from the supercharger to the oil pan;
    an air introducing passage arranged to introduce air into the oil passage at a location downstream of the supercharger and upstream of the pump; and
    a flow rate regulating component provided in the air introducing passage, the flow rate regulating component being configured to regulate a flow rate of the air introduced into the oil passage by variably adjusting the air supplied to the oil passage while the supercharger is operating.

2. The engine supercharger lubricating apparatus as recited in claim 1, wherein
    the flow rate regulating component is an orifice device.

3. The engine supercharger lubricating apparatus as recited in claim 1, wherein
    the air introducing passage includes an opening part formed inside a crankcase of the engine for introducing air into the air introducing passage.

4. The engine supercharger lubricating apparatus as recited in claim 3, wherein
    the opening part of the air introducing passage is positioned lower than a rotary shaft of the supercharger when a vehicle in which the engine is installed is stopped on a level surface.

5. The engine supercharger lubricating apparatus as recited in claim 1, wherein
    the pump is configured to create a suction in the oil passage such that the pump draws the lubricating oil from the supercharger to the oil pan via the pump, with the air introduced in the oil passage decreasing the suction created by the pump while the supercharger is operating.

6. An engine supercharger lubricating apparatus comprising:
    oil passage means for supplying a lubricating oil to a supercharger of an engine and for returning the lubricating oil from the supercharger to an oil pan;
    pump means for pumping the lubricating oil via the oil passage means from the supercharger to the oil pan at a location downstream of the supercharger;
    air introducing means for introducing air into the oil passage means at a location downstream of the supercharger and upstream of the pump means; and
    flow rate regulating means for regulating a flow rate of the air introduced into the oil passage means by variably adjusting the air supplied to the oil passage means while the supercharger is operating.

7. The engine supercharger lubricating apparatus as recited in claim 6, wherein
the pump means further performs a function of creating a suction in the oil passage means such that the pump means draws the lubricating oil from the supercharger to the oil pan via the pump means, with the air introduced in the oil passage means decreasing the suction created by the pump means while the supercharger is operating.

8. A method of lubricating a supercharger of an engine comprising:
supply a lubricating oil to a supercharger of the engine;
creating negative pressure by a pump in an oil passage between the supercharger to an oil pan of the engine to draw the lubricating oil from the supercharger to the oil pan;
introducing air into the oil passage at a location downstream of the supercharger and upstream of the oil pan to decrease the negative pressure in the oil passage; and
regulating a flow rate of the air introduced into the oil passage by variably adjusting the air supplied to the oil passage while the supercharger is operating.

9. The method as recited in claim 8, wherein
the creating of the negative pressure includes creating a suction in the oil passage by the pump arranged in the oil passage such that the pump draws the lubricating oil from the supercharger to the oil pan via the pump, with the air introduced in the oil passage decreasing the suction created by the pump while the supercharger is operating.

* * * * *